June 19, 1945. C. H. HARRIS 2,378,406
PHOTOGRAPHIC CAMERA
Filed Oct. 3, 1941 2 Sheets-Sheet 2

INVENTOR.
Clinton H. Harris
BY
Attorney

Patented June 19, 1945

2,378,406

UNITED STATES PATENT OFFICE 2,378,406

PHOTOGRAPHIC CAMERA

Clinton H. Harris, Ann Arbor, Mich., assignor to Argus, Incorporated, a corporation of Michigan Application October 3, 1941, Serial No. 413,518

11 Claims. (Cl. 95—31)

The present invention relates to photographic cameras and especially to cameras of the perforated roll film type.

One of the objects of the present invention is to provide a photographic camera which is simple and rugged in construction and which can be easily and inexpensively assembled. Another object is to provide a camera in which the film feeding, exposure counting and focusing mechanisms may be independently assembled before assembly of the camera. A further object is to provide a camera in which the focusing mechanism and the exposure counting mechanism are assembled on a front plate before the front plate is attached to the camera body. These and other objects and advantages reside in certain novel features of construction, arrangement and combinations of parts as will hereinafter be more fully set forth and pointed out in the appended claims.

Figure 1:
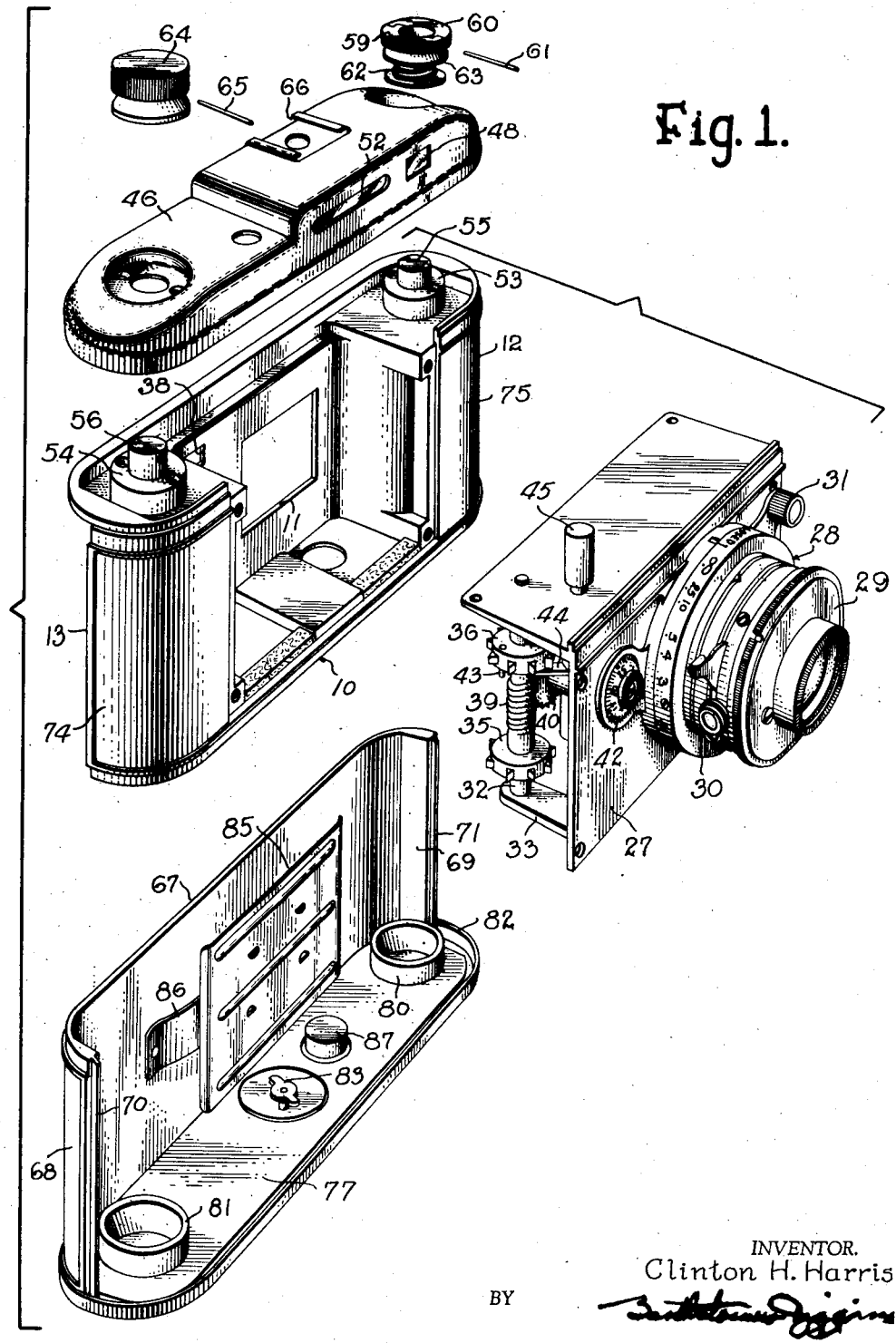
Fig. 1 is an exploded perspective view showing how the parts of the camera go together.
Figure 2:
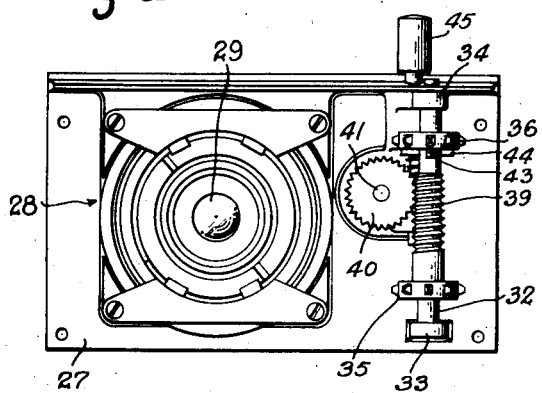
Fig. 2 is a rear elevation of the front plate.

One embodiment of my invention is illustrated in the drawing wherein 10 designates the body portion of the camera. This body member 10 has an inner wall formed with exposure aperture 11 and two rearwardly facing film chambers 12 and 13, one on each side of the exposure aperture 11. Tracks 14 and 15, respectively above and below the exposure aperture 11, extend between the film chambers 12 and 13 are form guides for a film as it is moved across the aperture between the chambers.

Between the film chambers 12 and 13, the body 10 of the camera has a forwardly facing recess which is covered by a front plate 27. This front plate 27 carries an objective focusing mechanism indicated generally at 28 and an exposure counting mechanism as will be hereinafter described. A suitable objective and shutter indicated at 29 is fixed on the focusing mount 28.

The focusing mechanism 28 may be of any of a number of different types. One suitable mechanism is described and claimed in my U. S. Patent No. 2,357,326, issued September 5, 1944, and entitled "Focusing objective mount." In the objective mount described in that application, the objective 29 is focused by a ring 30 which may be provided with a handle 31. The usual distance scale may be engraved on the ring 30. Another suitable focusing mount is shown and claimed in U. S. Patent No. 2,357,327, issued September 5, 1944, and entitled "Focusing objective mount."

Also mounted on the front plate 27 is a suitable exposure counter. I prefer to use an exposure counter of the type described and claimed in my U. S. Patent No. 2,358,327, issued September 19, 1944, and entitled "Exposure counter." This counter consists of a vertical spindle 32 rotatably mounted in lugs 33 and 34 which project rearwardly from the front plate 27. Sprocket wheels 35 and 36 are fixed on the spindle 32 and are spaced to project through slots 37 and 38 respectively in the camera body 10 and engage in the perforations of the usual perforated roll film.

Between the sprocket wheels 35 and 36, the spindle 32 is threaded as indicated at 39 and a worm wheel 40, fixed on a shaft 41, engages the threaded portion 39 of the spindle 32. The shaft 41 is journalled in a suitable bearing in the front plate 27 and an indicator disk 42 is frictionally secured to the shaft 41 on the front of the plate 27. This disk 42 indicates the number of exposures which have been made as is well known in the art.

In order to stop the film when a length sufficient to make an exposure has been wound into position at the exposure aperture 11, the sprocket 36 is provided with a pin 43 which extends into the path of a detent 44. This detent 44 may be moved out of the path of the pin 43 to permit the moving of a fresh portion of film into the exposure position by means of a manually operable knob 45 which extends upward beyond the top of the camera. The detent 44 is so constructed that the pin 43 passes by it when the film is rewound.

After the focusing mechanism and the exposure counter have been assembled on the plate 27, the plate 27 is secured on the camera body 10 by screws or rivets, not shown. A top or cap 46 is then placed in position. This cap 46 extends down over the top of the body 10 and front plate 27, helping to hold them in proper relative position and forming a light seal along the top of the camera.

Suitable viewfinder lenses, not shown, may be suitably mounted in the cap 46 in alinement with the apertures 47 and 48 as is known in the art. Graduated filter elements 49 and 50 may also be secured within the cap 46 in alinement with elongated apertures 51 and 52 to form an extinction type exposure meter.

Two spindles 55 and 56 are journalled in bearings 53 and 54 respectively. These bearings 53 and 54 are carried by the camera body 10 in alinement with the film chambers 12 and 13 respectively. The lower ends of the spindles 55 and 56 extend down into the chambers 12 and 13 and are bifurcated at 57 and 58 to engage film spools. The upper ends of these spindles 55 and 56 extend upward through suitable holes in the cap 46 to a convenient location for winding or rewinding the film. The cap 46 is rigidly fastened to the bearings 53 and 54 by screws or bolts, not shown.

For turning the spindle 55, I prefer a foldable winding device of the type shown and claimed in my U. S. Patent No. 2,357,328, issued September 5, 1944, and entitled "Film winding mechanism." This device consists of two handles 59 and 60 pivotally secured to the spindle 55 by a pin 61. A helical spring 62 is wound around the spindle 55 and presses a collar 63 upward against the handles 59 and 60 to hold them in raised or folded position. The spindle 56 may have either a similar winding mechanism or a solid knob 64 secured thereto by a pin 65.

A suitable clip 66 may be provided on the cap 46 for holding various accessories.

The back and bottom of the camera is closed by a cover 67. This cover 67 has side wall portions 68 and 69 formed with tongues 70 and 71 which engage in complemental grooves 72 and 73 respectively, in the side wall portions 74 and 75 of the camera body 10. These tongue and groove connections form light seals along the sides of the camera.

The top wall of the camera body 10 is cut back as indicated at 76 adjacent and under the cap 46 to receive the top edge of the cover 67. Thus, the cap 46, the top edge of the cover 67, and the top of the body 10 form an effective light seal.

Figure 3:
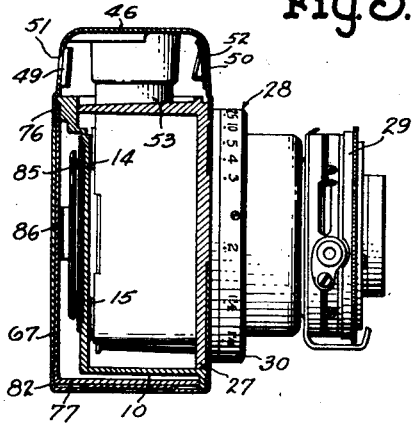
Fig. 3 is a section taken on line 3—3 of Fig. 4.
Figure 4:
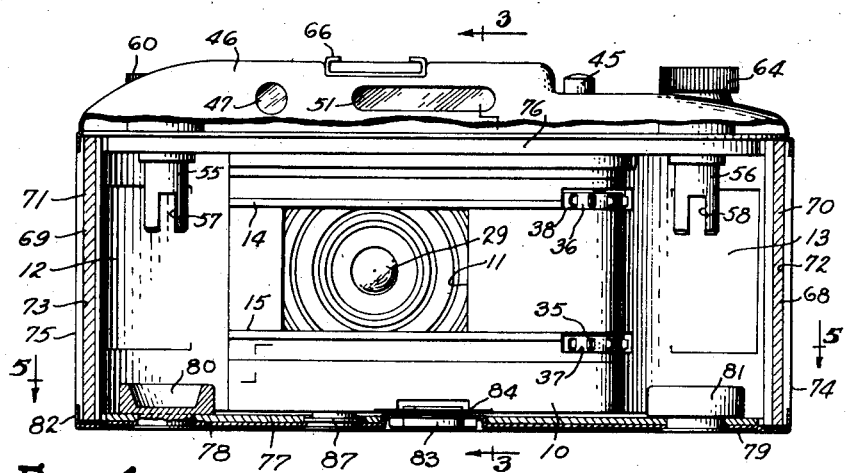
Fig. 4 is a rear elevation of the camera with parts broken away to show internal structure.
Figure 5:
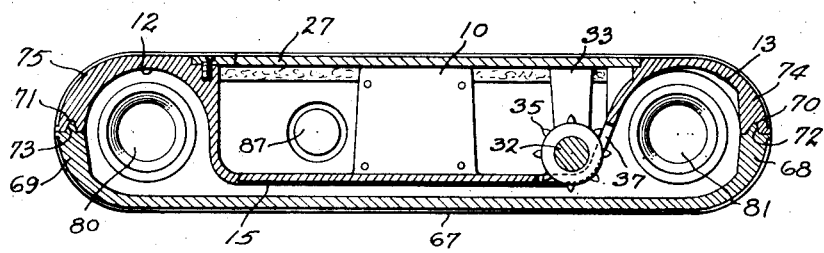
Fig. 5 is a section taken on line 5—5 of Fig. 4.

The bottom 77 of the cover 67 has two openings 78 and 79 in alinement with the spindles 55 and 56, respectively. Two cups 80 and 81 are mounted in these openings 78 and 79 to serve as seats for film spools in the film chambers 12 and 13. The bottoms of the cups 80 and 81 are spun over a lower cap 82 as shown in Fig. 5. This lower cap 82 extends outwardly beyond the bottom 77 of the cover 67 so that the lower edge of the body 10 may fit between the bottom 77 and the lower cap 82, as shown in Fig. 3. This completes the light seal between the body 10 and the cover 67.

A latch element 83 is rotatably mounted in the bottom 77 of the cover 67 and releasably engages a suitable latch element 84 on the body 10. These latch elements may be of any form suitable for detachably securing the cover 67 to the camera body 10.

A pressure plate 85 is resiliently attached to the cover 67 by a spring 86. This pressure plate 85 holds the film flat against the tracks 14 and 15 at the exposure aperture 11.

If desired, a tripod socket 87 may be suitably fastened in the bottom 77 of the cover 67.

As can be readily seen in the drawings, the camera of the present invention is very easy and inexpensive to assemble. The front plate 27 with the focusing objective mount and exposure counting device can be completed as a sub-assembly before the front plate is secured to the camera body 10. Thus, the different assembly operations may be divided and the parts are readily accessible during these operations. Since these mechanisms are the most intricate parts of the camera, this simplification of assembly obviously reduces the cost of production of the camera as a whole.

From the foregoing, it is apparent that I have attained the objects of my invention and have provided a rugged and accurate camera which can be easily and inexpensively manufactured. Various modifications can of course be made without departing from the spirit of my invention or the scope of the appended claims.

I claim:

1. In a camera for perforated roll film, a body member having an exposure aperture and a forwardly facing recess therein, a film chamber on each side of said aperture, means carried by said body member for moving film from one chamber to the other across said aperture, a front plate, a focusing objective mount carried by said front plate, an objective carried by said mount, a film sprocket rotatably mounted on said front plate, an exposure counter carried by said front plate and operatively connected to said sprocket whereby rotation of said sprocket actuates said counter, and means for securing said front plate to said body member over said recess with said objective in alinement with said exposure aperture and the sprocket within said recess extending into the path of the film.

2. A camera for perforated roll film comprising a body member having a front wall, a top wall and partial side walls, a film chamber at each end of said body member, a film track extending between said chambers, said film track having an exposure aperture therein, means carried by said body member for moving a film from one chamber to the other across said track, a front plate, a focusing objective mount carried by said plate, an objective carried by said mount, means for securing said front plate to said body member with the objective in alinement with said aperture so that said front plate becomes a section of said front wall, a cover member having a rear wall, a bottom wall and partial side walls, means for detachably securing said cover member to said body member, complemental light trap means on the partial side walls of said body member and said cover member, a top cap secured on said body member and extending down over the edges of said plate and said cover member, and a bottom cap secured on said cover member and extending up over the edge of said body member, said caps forming light seals for the top and bottom of the camera.

3. A photographic camera comprising a front wall member, a focusing objective mount carried by said front wall member, an objective carried by said mount, a film sprocket rotatably carried by said front wall member, an exposure counter carried by said front wall member, means for operatively interconnecting said counter and said sprocket whereby rotation of said sprocket operates said counter, a detent carried by said front wall member for stopping said sprocket after a predetermined amount of rotation, and manually operable means for releasing said detent, a camera body member having a film chamber at each end, film winding mechanism in each chamber, a film track between said chambers having an exposure aperture therein, means for securing said front wall member to said body member between said chambers with said objective in alinement with said exposure aperture, said film track having an opening therein permitting said sprocket to extend into the path of a film, a cover member, means for releasably securing said cover member to said body member, a pressure plate carried by said cover member for holding a film in the film track, a top cap secured to said body member and extending over said wall member and said cover member, and a bottom cap secured to said cover member and extending over said body member, said caps serving as light seals for the top and bottom edges of the camera.

4. In a camera, a body member formed with an exposure aperture, a forwardly facing recess aligned with said aperture and rearwardly facing film receiving chambers at opposite sides of said aperture, and a front member carrying the entire objective lens focusing and exposure counting mechanisms seated in said recess, said front member defining a section of the front wall of said camera, said exposure counting mechanism comprising a rotatable sprocket, and said body member being formed with an opening through which said sprocket extends into contact with the film.

5. In a camera, a body member comprising an inner wall located adjacent the back of the camera formed with an exposure aperture, integral extensions of said inner wall at each side of said exposure aperture with each of said extensions projecting forwardly and outwardly and terminating in rearwardly extending camera side wall portions, said extensions defining a large forwardly facing recess in the front of said body member and rearwardly facing film receiving chambers at opposite sides of said exposure aperture, and a front plate carrying the objective lens and exposure counting mechanism for the camera seated in said recess, said exposure counting mechanism comprising a rotatable sprocket, and said inner wall being formed with an opening through which said sprocket extends into engagement with the film.

6. In a camera having a body providing generally arcuate ends and an objective lens mount intermediate its ends, said body being made up of a rear member at the open top, a complete bottom wall, a complete rear wall, and partial end walls defining portions of said generally arcuate ends; a complemental member having partial end walls adapted to complete said generally arcuate ends, a longitudinal wall having an exposure aperture registering with said objective lens mount, a pair of transverse internal walls projecting forwardly from the ends of said longitudinal wall and cooperating therewith to define a large recess opening onto a pair of front wall portions located adjacent said partial end walls, said transverse internal walls, said front and said partial end walls defining rearwardly facing film receiving chambers adapted to be closed by the rear and partial end walls of said rear member, and said longitudinal wall of said complemental member being spaced from said rear wall of said rear member to provide a passage through which the film is moved between said film receiving chambers and past said exposure aperture; a bottom structure joining said transverse internal walls and adapted to overlie the bottom wall of said rear member; a third member providing a top structure for the camera overlying said recess in said complemental member, an objective lens mount structure secured to said complemental member and closing the front of said recess, and cooperating means on said bottom structure of the complemental member and said bottom wall of the rear member for releasably securing said rear member to the complemental member.

7. The camera construction defined in claim 6, wherein said objective lens mount structure comprises a rearwardly directed wall closing the open top of said recess inwardly of said top structure.

8. The camera construction defined in claim 6, wherein the upper edges of said generally arcuate ends of said complemental member are provided with light-trapping tongues and said objective mount structure is provided along its upper edge with a light trapping tongue aligning with the neighboring ends of said first named tongues, said tongues being disposed in light-trapping relationship with a wall provided in said top structure.

9. The camera construction defined in claim 6, wherein the ends of said complemental member are provided with partial top walls joining the upper edges of the transverse internal walls and the partial end walls thereof, and a film winding spindle is journalled in each partial top wall.

10. A camera comprising a body, an inner wall on said body formed with an exposure aperture, a top wall on said body, a front wall on said body terminating at opposite ends in substantially arcuate partial side walls, a lens mount on said front wall aligned with said aperture, a separable rear cover for said camera at the open top and extending over said inner wall and comprising integral bottom and rear walls for said camera, said camera rear wall terminating at opposite ends in integral substantially arcuate partial side walls interfitting in light tight relation with the partial side walls of said body, and cooperating means on said bottom wall of the rear cover and on said body for detachably securing said rear cover to the body.

11. In the camera defined in claim 10, a section of said front wall carrying said lens mount being removably mounted on said body and an objective lens and shutter assembly mounted on said section.

CLINTON H. HARRIS.

CERTIFICATE OF CORRECTION.

Patent No. 2,378,406. June 19, 1945.

CLINTON H. HARRIS.

It is hereby certified that error appears in the printed specification of the above numbered patent requiring correction as follows: Page 1, first column, line 36, for "13 are" read --13 and--; line 48, for "Oue" read --One--; page 3, second column, line 9, claim 6, after "member" strike out the comma and insert instead a semi-colon; line 42, claim 10, for the words "at the open" read --open at the--; and that the said Letters Patent should be read with this correction therein that the same may conform to the record of the case in the Patent Office.

Signed and sealed this 1st day of January, A. D. 1946.

Leslie Frazer (Seal) First Assistant Commissioner of Patents.